(12) United States Patent
Miyatake et al.

(10) Patent No.: US 7,167,288 B2
(45) Date of Patent: Jan. 23, 2007

(54) OPTICAL SCANNING UNIT, IMAGE FORMING APPARATUS, AND METHOD OF CORRECTING POSITIONAL MISALIGNMENT

(75) Inventors: Naoki Miyatake, Kanagawa (JP); Mitsuo Suzuki, Kanagawa (JP); Seizo Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 202 days.

(21) Appl. No.: 10/981,677

(22) Filed: Nov. 5, 2004

(65) Prior Publication Data

US 2005/0093962 A1    May 5, 2005

(30) Foreign Application Priority Data

Nov. 5, 2003    (JP)    ............................. 2003-375811

(51) Int. Cl.
G02B 26/08    (2006.01)

(52) U.S. Cl. .................... 359/204; 347/234; 347/249

(58) Field of Classification Search ................ 359/204, 359/216; 347/234, 235, 248, 249
See application file for complete search history.

(56) References Cited

U.S. PATENT DOCUMENTS

| | | |
|---|---|---|
| 4,726,640 A | 2/1988 | Iwama et al. |
| 4,953,171 A | 8/1990 | Nakajima et al. |
| 4,995,710 A | 2/1991 | Suzuki et al. |
| 5,005,928 A | 4/1991 | Suzuki et al. |
| 5,069,515 A | 12/1991 | Itami et al. |
| 5,355,244 A | 10/1994 | Suzuki et al. |
| 5,453,650 A | 9/1995 | Hashimoto et al. |
| 5,459,601 A | 10/1995 | Suzuki et al. |
| 5,510,664 A | 4/1996 | Suzuki et al. |
| 5,546,216 A | 8/1996 | Suzuki |
| 5,574,591 A | 11/1996 | Suzuki et al. |
| 5,606,181 A | 2/1997 | Sakuma et al. |
| 5,606,448 A | 2/1997 | Suzuki et al. |
| 5,612,599 A | 3/1997 | Itami et al. |
| 5,680,254 A | 10/1997 | Ueda et al. |
| 5,717,511 A | 2/1998 | Suzuki |
| 5,726,699 A | 3/1998 | Itami et al. |
| 5,739,602 A | 4/1998 | Suzuki et al. |
| 5,769,544 A | 6/1998 | Suzuki et al. |
| 5,838,024 A | 11/1998 | Masuda et al. |
| 5,875,051 A | 2/1999 | Suzuki et al. |
| 5,909,966 A | 6/1999 | Suzuki et al. |
| 5,962,874 A | 10/1999 | Masuda et al. |
| 5,969,844 A | 10/1999 | Itami et al. |
| 5,986,791 A | 11/1999 | Suzuki et al. |
| 6,069,724 A | 5/2000 | Hayashi et al. |

(Continued)

FOREIGN PATENT DOCUMENTS

JP    2000-238319    9/2000

(Continued)

*Primary Examiner*—Euncha P. Cherry
(74) *Attorney, Agent, or Firm*—Oblon, Spivak, McClelland, Maier & Neustadt, P.C.

(57) ABSTRACT

An optical scanning unit includes an optical deflector, a plurality of scanning optical systems, and a pixel-clock generating unit. A photodetector is arranged in at least two locations on a writing-start side and a writing-end side outside the writing area. The optical scanning unit measures a scanning time, and corrects respective dot positions of image data in the writing area to arbitrary positions based on an amount of fluctuation of the scanning time measured.

19 Claims, 11 Drawing Sheets

U.S. PATENT DOCUMENTS

| | | | |
|---|---|---|---|
| 6,081,386 A | 6/2000 | Hayashi et al. |
| 6,104,522 A | 8/2000 | Hayashi et al. |
| 6,141,133 A | 10/2000 | Suzuki et al. |
| 6,150,779 A | 11/2000 | Itami et al. |
| 6,188,086 B1 | 2/2001 | Masuda et al. |
| 6,222,662 B1 | 4/2001 | Suzuki et al. |
| 6,233,081 B1 | 5/2001 | Suzuki et al. |
| 6,256,133 B1 | 7/2001 | Suzuki et al. |
| 6,281,609 B1 | 8/2001 | Itami et al. |
| 6,330,017 B1 | 12/2001 | Suzuki |
| 6,347,004 B1 | 2/2002 | Suzuki et al. |
| 6,359,717 B1 | 3/2002 | Suzuki et al. |
| 6,384,949 B1 | 5/2002 | Suzuki |
| 6,388,792 B1 | 5/2002 | Atsuumi et al. |
| 6,400,391 B1 | 6/2002 | Suhara et al. |
| 6,417,509 B1 | 7/2002 | Atsuumi et al. |
| 6,448,998 B1 | 9/2002 | Suzuki et al. |
| 6,465,918 B1 | 10/2002 | Itami et al. |
| 6,509,995 B1 | 1/2003 | Suzuki et al. |
| 6,580,186 B1 | 6/2003 | Suzuki et al. |
| 6,596,985 B1 | 7/2003 | Sakai et al. |
| 6,606,179 B1 | 8/2003 | Suzuki et al. |
| 6,621,512 B1 | 9/2003 | Nakajima et al. |
| 6,657,761 B1 | 12/2003 | Suzuki et al. |
| 6,697,181 B1 | 2/2004 | Masuda |
| 6,744,545 B1 | 6/2004 | Suhara et al. |
| 6,771,300 B1 | 8/2004 | Amada et al. |
| 6,771,407 B1 | 8/2004 | Hayashi et al. |
| 6,778,203 B1 | 8/2004 | Itami et al. |
| 6,781,729 B1 | 8/2004 | Suzuki et al. |
| 6,785,028 B1 | 8/2004 | Atsuumi et al. |
| 6,788,444 B1 | 9/2004 | Suzuki et al. |
| 6,791,729 B1 | 9/2004 | Atsuumi et al. |
| 6,800,845 B1 | 10/2004 | Sakai et al. |
| 6,801,351 B1 | 10/2004 | Suzuki et al. |
| 6,813,051 B1 | 11/2004 | Suzuki et al. |
| 6,927,789 B1 * | 8/2005 | Ozasa et al. ................. 347/249 |
| 2002/0080428 A1 | 6/2002 | Suzuki et al. |
| 2002/0131137 A1 | 9/2002 | Suzuki |
| 2003/0011830 A1 | 1/2003 | Miyatake |
| 2003/0011891 A1 | 1/2003 | Suzuki et al. |
| 2003/0133175 A1 | 7/2003 | Suzuki et al. |
| 2003/0156184 A1 | 8/2003 | Suzuki et al. |
| 2003/0156310 A1 | 8/2003 | Suzuki et al. |
| 2003/0160529 A1 | 8/2003 | Suzuki et al. |
| 2003/0179428 A1 | 9/2003 | Suzuki et al. |
| 2003/0206322 A1 | 11/2003 | Atsuumi et al. |
| 2003/0214693 A1 | 11/2003 | Hayashi et al. |
| 2003/0218788 A1 | 11/2003 | Sakai et al. |
| 2004/0001136 A1 | 1/2004 | Suzuki et al. |
| 2004/0001241 A1 | 1/2004 | Hayashi et al. |
| 2004/0032631 A1 | 2/2004 | Amada et al. |
| 2004/0036936 A1 | 2/2004 | Nakajima et al. |
| 2004/0090520 A1 | 5/2004 | Sakai et al. |
| 2004/0125199 A1 | 7/2004 | Omori et al. |
| 2004/0184125 A1 | 9/2004 | Suzuki |

FOREIGN PATENT DOCUMENTS

| | | |
|---|---|---|
| JP | 2000-289251 | 10/2000 |
| JP | 2003-103830 | 4/2003 |

* cited by examiner

LENS HAVING STRONG REFRACTING POWER IN MAIN SCANNING DIRECTION

| PHASE SHIFT AMOUNT | PHASE DATA |
|---|---|
| 0 | 00 |
| +1/8PLCK | 01 |
| -1/8PLCK | 11 |

OPTICAL SCANNING UNIT, IMAGE FORMING APPARATUS, AND METHOD OF CORRECTING POSITIONAL MISALIGNMENT

CROSS-REFERENCE TO RELATED APPLICATIONS

The present document incorporates by reference the entire contents of Japanese priority document, 2003-375811 filed in Japan on Nov. 5, 2003.

BACKGROUND OF THE INVENTION

1) Field of the Invention

The present invention relates to an image forming apparatus, an optical scanning unit included in the image forming apparatus and a method of correcting positional misalignment adopted in the optical scanning unit.

2) Description of the Related Art

Conventionally, an optical scanning optical system causes scanning velocity unevenness on a surface to be scanned (photosensitive element) due mainly to three reasons described below. As a result, positional misalignment of main scanning dots occurs. In particular, when a color image is formed, the scanning velocity unevenness appears as color drift to cause deterioration in reproducibility of colors and deterioration in resolution.

As a first reason, an fθ characteristic of a scanning lens is not corrected sufficiently.

As a second reason, accuracy of optical components of an optical scanning optical system and accuracy of attachment of the optical components on a housing deteriorate.

As a third embodiment, optical components are deformed due to an environmental fluctuation in temperature, humidity, and the like in an image forming apparatus, and an fθ characteristic deteriorates because a focal length changes due to a fluctuation in a refractive index.

In particular, it is difficult to avoid positional misalignment of main scanning dots due to an environmental fluctuation, which is the third reason, even if optical adjustment or electrical correction is carried out when products are shipped.

Consequently, recently, aiming at improvement in a scanning characteristic, a special surface represented by an aspheric surface has been adopted in an optical element of an optical scanning unit. An "optical element made of resin", from which this special surface can be formed easily and inexpensively, has been often used. In particular, in an image forming apparatus of a tandem type, since a large number of optical elements are used, the use of the "optical element made of resin" results in significant reduction in cost.

However, since the "optical element made of resin" has a large thermal expansion coefficient compared with glass, a shape of the optical element is deformed largely due to a change in temperature, and an optical characteristic of the optical element changes. Therefore, when temperature in an optical box rises due to deflecting means like a polygon mirror that generates a large amount of heat, the heat is never conducted uniformly due to an air current caused by rotation of the polygon mirror or a difference in a shape in the optical box. As a result, a temperature distribution occurs in the optical box. In addition, in a scanning lens, a uniform temperature change is never caused due to a difference in a way of conduction of heat, a difference in a lens shape (difference in an installation area in the optical box), and the like. As a result, a temperature difference is caused depending on a location of the scanning lens.

Note that, in the image forming apparatus of the tandem type, since light beams directed to respective photosensitive elements pass through different scanning lenses, different temperature distributions occur among the respective scanning lenses depending on a temperature distribution in the optical box holding the scanning lenses. As a result, a change in a shape and a change in a refractive index of the scanning lenses are not uniform, and amounts of a change in a scanning length and changes in uniformity of velocity are different among the respective photosensitive elements. When latent images on these photosensitive elements are visualized by developing devices using developers of different colors like yellow (Y), magenta (M), cyan (C), and black (B) and then the visualized images are sequentially transferred to be superimposed one on top of another and fixed on identical recording paper to form a color image, so-called "color drift" occurs. In particular, when the "optical element made of resin" is used as a scanning lens closest to the deflecting means such as the polygon mirror, which generates a large amount of heat, in the optical box, a change in an optical characteristic of the optical element increases.

Moreover, when images are outputted continuously, in particular, when the number of sheets to be outputted continuously is large, temperature in the image forming apparatus (temperature in the optical box) rises due to heat generation of the deflecting means. Therefore, color drift is caused by changes in temperature distributions of the respective scanning lenses, and an amount of a fluctuation thereof also changes at any time. As a result, a color tint varies in an image outputted first and an image outputted last due to the color drift.

Note that, as a technical document that was filed earlier than the present invention, there is an optical scanning unit that has a writing start position detection sensor disposed in an arbitrary position outside an image area of a photosensitive drum and corrects writing start positions of image formation in respective colors within an error of one clock (see, for example, Japanese Patent Application Laid-Open No. 2000-238319).

In addition, there is an image forming apparatus that adjusts a writing start position and a writing finish position in a main scanning direction to reduce positional misalignment in image formation in the main scanning direction (see, for example, Japanese Patent Application Laid-Open No. 2000-289251).

Further, there is a pixel clock generating apparatus that has a function of shifting phases of signals of an image clock for performing image formation based on phase data according to timing of a clock signal from high-frequency clock generating means. In the pixel clock generating apparatus, data for performing phase shift is set by a unit of data area constituted by plural continuous clock signals (see, for example, Japanese Patent Application Laid-Open No. 2003-103830).

However, in the technologies disclosed in Japanese Patent Application Laid-Open No. 2000-238319 and Japanese Patent Application Laid-Open No. 2000-289251, an influence of positional misalignment of main-scanning dots, which is caused by an optical system or a deflector, cannot be corrected. In addition, in the technology disclosed in Japanese Patent Application Laid-Open No. 2003-103830, phase-shift data for performing phase shift is set by a unit of data area constituted by plural continuous clock signals. This makes it possible to perform control that is less affected by a delay or the like in a data transfer speed when a fluctuation in a phase-shift amount due to changes in various conditions like temperature and elapsed time. However, it is necessary to further reduce color drift to meet a demand for high image quality in recent years.

SUMMARY OF THE INVENTION

It is an object of the present invention to solve at least the above problems in the conventional technology.

An optical scanning unit according to one aspect of the present invention includes an optical deflector that deflects light beams emitted from a plurality of light sources corresponding to each of a plurality of colors; a plurality of scanning optical systems that focuses the light beams deflected by the optical deflector on a writing area corresponding to each of the colors on a surface to be scanned; and a pixel-clock generating unit that causes the optical deflector to scan the light beams emitted from the light sources on the surface to be scanned along a scanning direction to shift phases of respective signals of a pixel clock that forms an image based on phase-shift data according to timing of a clock signal. A photodetector that detects the light beams is arranged in at least two locations on a writing-start side and a writing-end side outside the writing area. The optical scanning unit measures a scanning time, during which light beams pass through the photodetector arranged in the two locations, and corrects respective dot positions of image data in the writing area to arbitrary positions based on an amount of fluctuation of the scanning time measured.

An image forming apparatus according to another aspect of the present invention performs optical writing using an optical scanning unit to an image carrier, and forms an electrostatic latent image on the image carrier using an electrophotographic method. The optical scanning unit includes an optical deflector that deflects light beams emitted from a plurality of light sources corresponding to each of a plurality of colors; a plurality of scanning optical systems that focuses the light beams deflected by the optical deflector on a writing area corresponding to each of the colors on a surface to be scanned; and a pixel-clock generating unit that causes the optical deflector to scan the light beams emitted from the light sources on the surface to be scanned along a scanning direction to shift phases of respective signals of a pixel clock that forms an image based on phase-shift data according to timing of a clock signal. A photodetector that detects the light beams is arranged in at least two locations on a writing-start side and a writing-end side outside the writing area. The optical scanning unit measures a scanning time, during which light beams pass through the photodetector arranged in the two locations, and corrects respective dot positions of image data in the writing area to arbitrary positions based on an amount of fluctuation of the scanning time measured.

A method of correcting a positional misalignment, according to still another aspect of the present invention, in an optical scanning unit that includes an optical deflector that deflects light beams emitted from a plurality of light sources corresponding to each of a plurality of colors, a plurality of scanning optical systems that focuses the light beams deflected by the optical deflector on a writing area corresponding to each of the colors on a surface to be scanned, and a pixel-clock generating unit that causes the optical deflector to scan the light beams emitted from the light sources on the surface to be scanned along a scanning direction to shift phases of respective signals of a pixel clock that forms an image based on phase-shift data according to timing of a clock signal, includes detecting the light beams in at least two locations on a writing-start side and a writing-end side outside the writing area; measuring a scanning time, during which light beams pass through a photodetector arranged in the two locations; and correcting respective dot positions of image data in the writing area to arbitrary positions based on an amount of fluctuation of the scanning time measured.

The other objects, features, and advantages of the present invention are specifically set forth in or will become apparent from the following detailed description of the invention when read in conjunction with the accompanying drawings.

DETAILED DESCRIPTION

Exemplary embodiments of an optical scanning unit, an image forming apparatus, and a method of correcting positional misalignment according to the present invention will be explained in detail with reference to the accompanying drawings.

Figure 1:
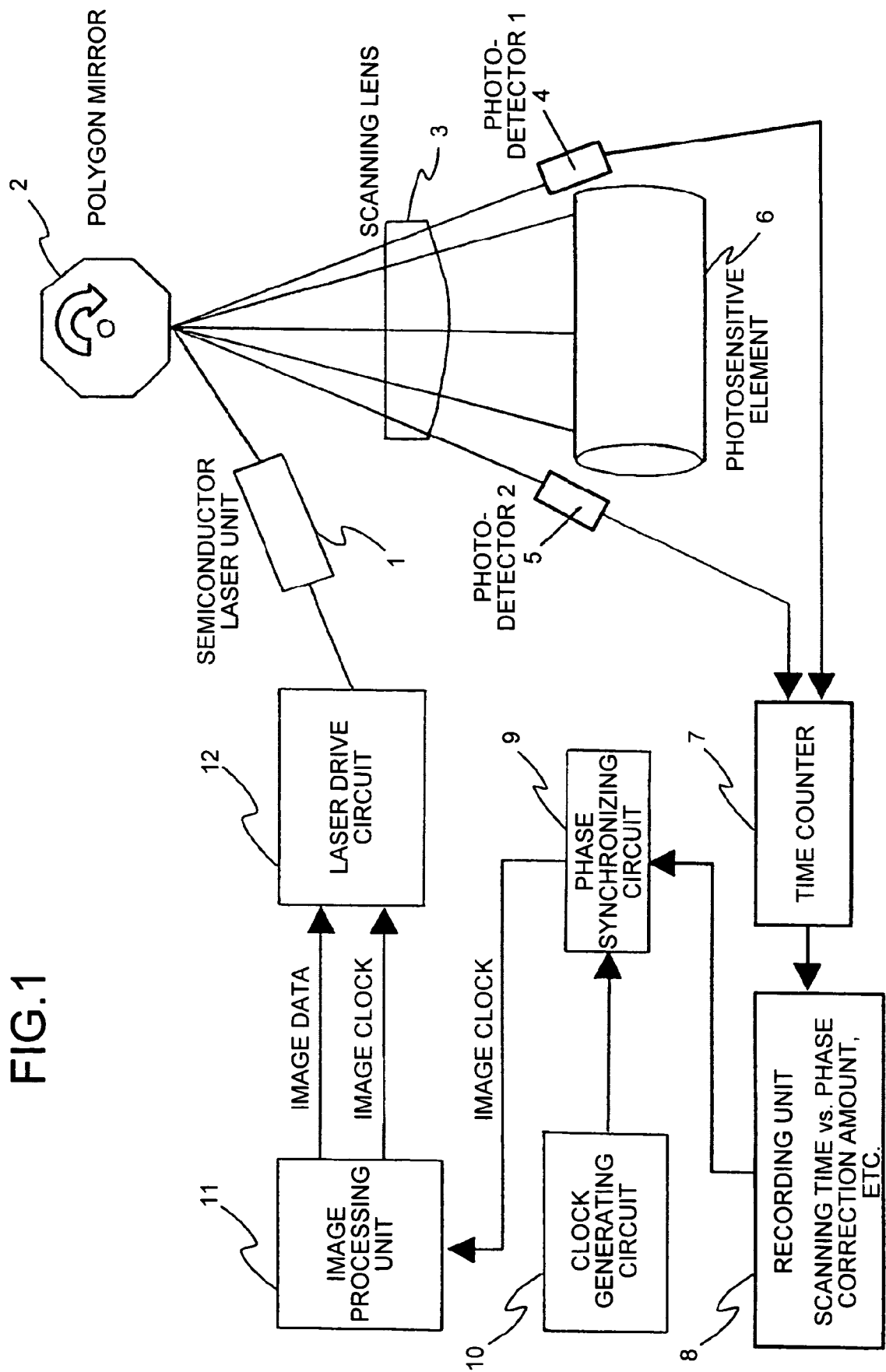
FIG. 1 is a diagram of an optical scanning unit according to the present invention.

FIG. 1 is a diagram of an optical scanning unit according to the present invention. The optical scanning unit according to the present invention will be explained with reference to FIG. 1. The optical scanning unit according to the present invention measures scanning time, during which light beams traverse photodetectors (4, 5), in a time counter (7), sets correction amount data for main dot positions based on the measured scanning time, generates phase-shifted image clock in a phase synchronizing circuit (9) based on the set correction amount data, and inputs image data generated in an image processing unit (11) to a laser drive circuit (12) based on the image clock generated in the phase synchronizing circuit (9). The laser drive circuit (12) modulates a light beam emitted from a semiconductor laser unit (1) according to the image data generated in the image processing unit (11) and controls main dot positions on a surface to be scanned to arbitrary positions.

Figure 2:
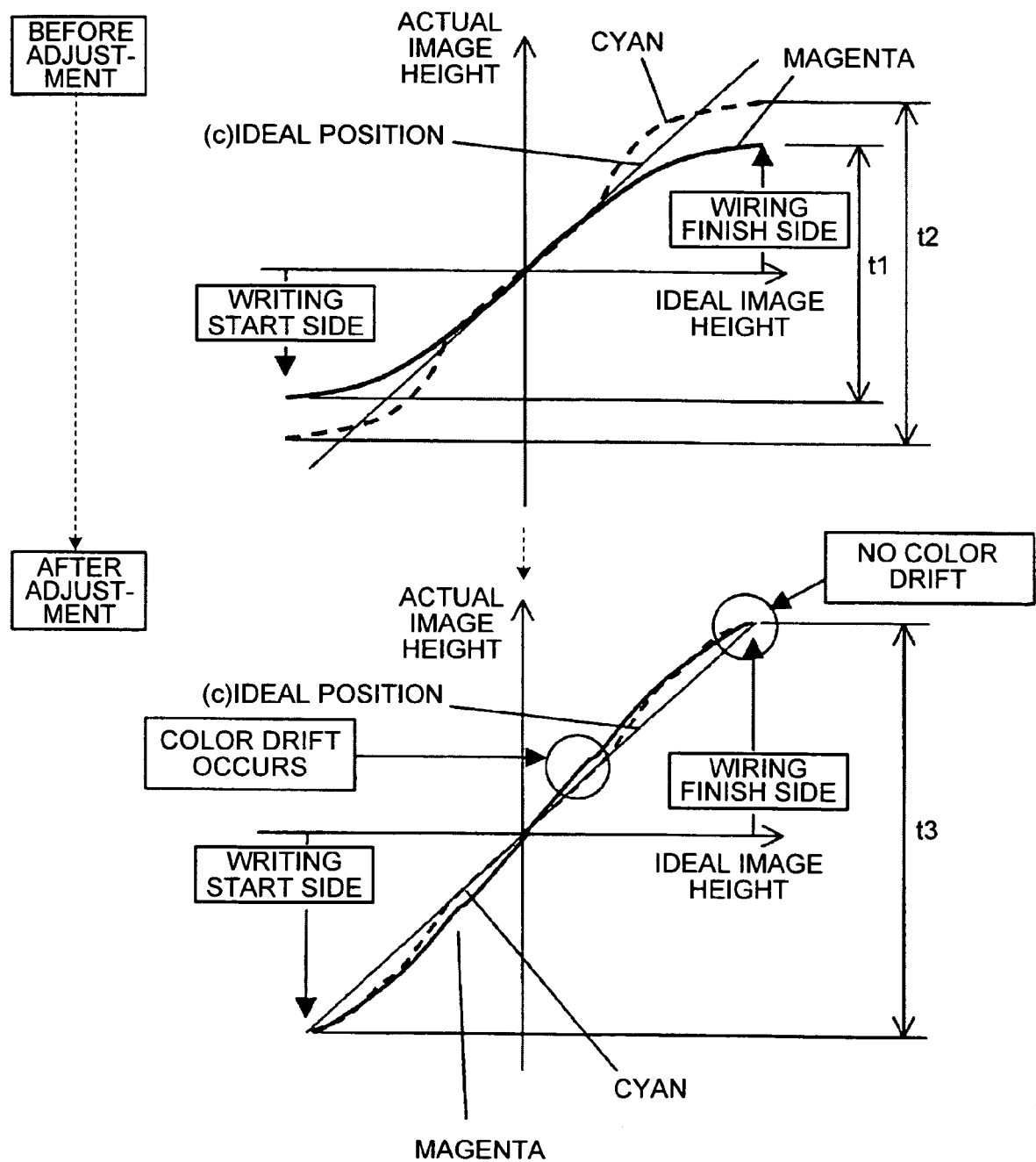
FIG. 2 is a diagram of a state before correcting a main dot position interval between a writing start end and a writing finish end (before adjustment) and a state after correcting the main dot position interval (after adjustment) according to measurement of scanning time during which light beams traverse a photodetector.
Figure 3:
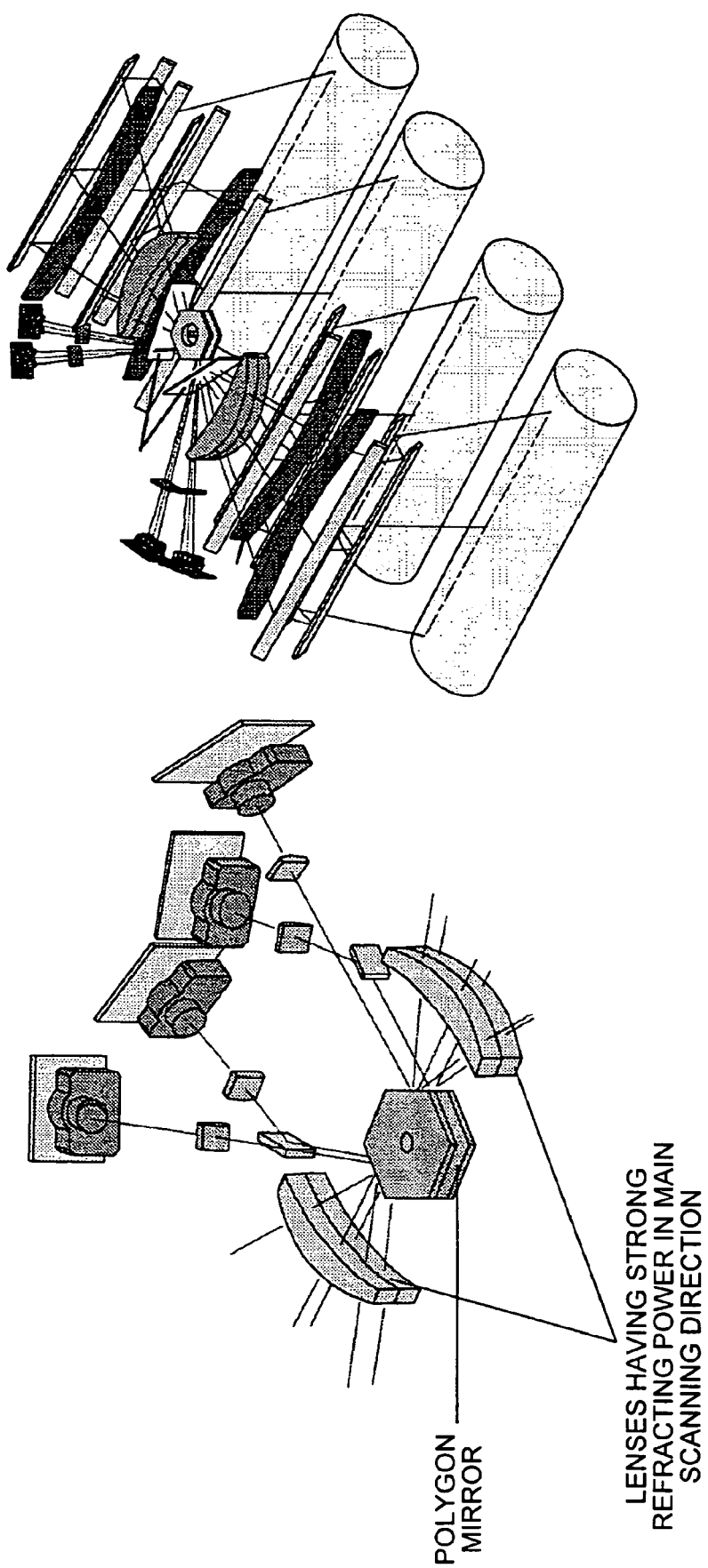
FIG. 3 is a diagram of an example of a structure of an optical scanning unit of an opposed scanning system according to the present invention.
Figure 4:
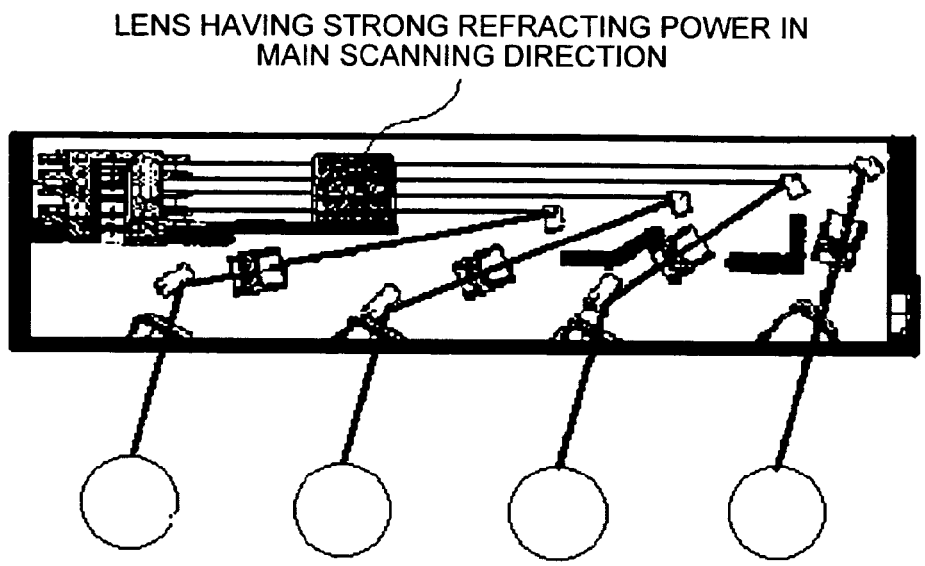
FIG. 4 is a diagram of an example of a structure of an optical scanning unit of a one side scanning system according to the present invention.

A structure of the optical scanning unit in a first embodiment of the present invention will be explained with reference to FIGS. 1 to 4. FIG. 2 is a diagram of a state before correcting a main dot position interval between a writing start end and a writing finish end (before adjustment) and a state after correcting the main dot position interval (after adjustment) according to measurement of scanning time during which light beams traverse a photodetector. FIG. 3 is a diagram of an example of a structure of an optical scanning unit of an opposed scanning system according to the present invention. FIG. 4 is a diagram of an example of a structure of an optical scanning unit of a one side scanning system according to the present invention.

As shown in FIG. 1, the optical scanning unit according to this embodiment includes a semiconductor laser unit (1), a polygon mirror (2), a scanning lens (3), two photodetectors (a photodetector 1 (4) and a photodetector 2 (5)), a photosensitive drum (6), a time counter (7), a recording unit (8), a phase synchronizing circuit (9), a clock generating circuit (10), an image processing unit (11), and a laser drive circuit (12).

The semiconductor laser unit (1) serving as a light source includes a semiconductor laser, a coupling lens, and a cylinder lens. A light beam emitted from this semiconductor laser unit (1) is deflected and reflected by the polygon mirror (2) serving as an optical deflector.

The scanning lens (3) is arranged on a course of light deflected and reflected by the polygon mirror (2). The scanning lens (3) focuses the light as a desired light spot on a surface to be scanned of the photosensitive drum (6) and corrects uniformity of velocity on the surface to be scanned. Note that a scanning direction in which scanning is performed using light on the photosensitive drum (6) is a main scanning direction.

The photodetectors (the photodetector 1 (4) and the photodetector 2 (5)) are arranged at a writing start end and a writing finish end outside an effective writing area of the surface to be scanned. Scanning time, during which light beams deflected and reflected by the polygon mirror (2) traverse the photodetectors (the photodetector 1 (4) and the photodetector 2 (5)), is measured in the time counter (7) serving as measuring means. The scanning time measured in the time counter (7) is inputted to the recording unit (8), which sets a main dot position correction amount based on the scanning time. Correction amount data set in the recording unit (8) is inputted to the phase synchronizing circuit (9), which phase-shifts a clock inputted from the clock generating circuit (10) according to the correction amount data and outputs the clock to the image processing unit (11) as an image clock. Thereafter, the image processing unit (11) outputs an image data signal and an image clock signal to the laser drive circuit (12) based on the image clock signal inputted from the phase synchronizing circuit (9). The laser drive circuit (12) outputs image data to the semiconductor laser unit (1) in synchronization with the image clock signal, whereby the semiconductor laser unit (1) is driven. Consequently, the semiconductor laser unit (1) emits a light beam modulated by the image data inputted from the laser drive circuit (12) to the polygon mirror (2).

In this way, scanning time, during which light beams traverse the photodetectors (4, 5), is measured in the time counter (7), correction amount data of main dot positions is set based on the measured scanning time, and an image clock, which is phase-shifted based on the set correction amount data, is generated in the phase synchronizing circuit (9) and inputted to the image processing unit (11). The image processing unit (11) inputs image data, which is generated based on the image clock inputted from the phase synchronizing circuit (9), to the laser drive circuit (12). The laser drive circuit (12) modulates a light beam emitted from the semiconductor laser unit (1) according to the image data. This makes it possible to control main dot positions on the surface to be scanned to arbitrary positions.

Since temperature of the optical scanning unit varies depending on environmental conditions, the main dot positions change due to expansion and contraction of an optical element, an optical box holding the optical element, and the like at the time of temperature change. This change in the main dot positions is corrected by measuring scanning time, during which a light beam transverses the photodetectors (4, 5) provided in at least two locations on the writing-start side and the writing-end side outside the effective writing area, and correcting an interval of the main dot positions between the writing start end and the writing finish end arbitrarily based on a fluctuation amount of the measured scanning time. At this point, a difference in the main dot position interval at the writing start end and the writing finish end, that is, a correction amount of a magnification error fluctuation amount is also corrected uniformly at an intermediate image height.

A fluctuation amount due to temperature in the main dot positions varies depending on an image height. Therefore, even if correction of the main dot positions is performed for each color, the main dot positions at the intermediate image height cannot be aligned, although the main dot positions at the writing start end and the writing finish end can be aligned (no color drift), as indicated by "after adjustment" in FIG. 2. As a result, color drift occurs at the intermediate image height in an output image (occurrence of color drift). In particular, in an optical system of an opposed scanning system shown in FIG. 3, when there is a temperature difference between scanning lenses having strong refracting power in the main scanning direction, an amount of this color drift is large.

In this embodiment, as shown in FIG. 1, the optical scanning unit has a function of causing a light beam outputted from the semiconductor laser unit (1) to scan a medium to be scanned along a scanning direction using the optical deflector (2) like a polygon mirror and shifting phase of respective signals of an image clock for performing image formation based on phase data according to timing of a clock signal outputted from the clock generating circuit (10). This makes it possible to correct positional misalignment of main dots at the intermediate image height.

In this way, a magnification error between the writing start end and the writing finish end can be found by the measurement of scanning time, during which light beams traverse the photodetectors (4, 5) provided in at least in two locations on the writing-start side and the writing-end side outside the effective writing area. Thus, it is possible to correct all main dot positions in the writing area and reduce color drift of an output image by referring to measurement data stored in the recording unit (8) in advance or data of a positional misalignment amount of main dots at each image height calculated by simulation. Moreover, since satisfactory uniformity of velocity can be obtained for the respective colors, reproducibility of an image is improved significantly.

In this embodiment, it is possible to hold data of positional misalignment correction amounts of main dots as a lookup table. However, if positional misalignment amounts of main dots at respective image heights calculated by measurement or simulation are represented by a function to obtain correction amounts by an arithmetic operation, it is possible to reduce a capacity stored in the recording unit (8) in advance significantly and realize reduction in color drift at low cost.

Moreover, the photodetectors (4, 5) provided in at least two locations on the writing-start side and the writing-end side outside the effective writing area are held only by a third optical system corresponding to one color among third optical systems corresponding to plural colors scanned on an identical reflection surface of the polygon mirror (2). This makes it possible to reduce the number of photodetectors (4, 5) and realize further reduction in cost.

For example, as shown in FIG. 3 (the opposed scanning system) and FIG. 4 (the one side scanning system), in general, first lenses having a strong refractive index in the main scanning direction (lenses having strong refracting power in the main scanning direction) among the third optical systems corresponding to plural colors scanned on the identical reflection surface of the polygon mirror are arranged side by side in a sub-scanning direction or integrally formed. Temperatures in positions where light beams of the respective colors pass, in particular, temperatures at the time when the polygon mirror is not rotating, for example, at the time of power supply and at the time of standby are substantially identical.

Thus, the photodetectors provided in at least two locations on the writing-start side and the writing-end side outside the effective writing area are held only by the third optical system corresponding to one color among the third optical systems corresponding to plural colors scanned on the identical reflection surface of the polygon mirror to perform correction of main dot positions. This makes it possible to reduce color drift of an output image at low cost.

For example, in third optical systems that are arranged symmetrically across a polygon mirror of an opposed scanning system, since arrangement positions differ largely among first lenses having a strong refractive index in the main scanning direction, it is highly likely that the first lenses have a temperature difference. When the same correction as described above is applied to plural colors scanned on different reflection surfaces of the polygon mirror in the opposed scanning system, it is highly likely that positional correction of main dots at an intermediate image height is not performed satisfactorily, and positional misalignment appears as color drift in an output image. At this point, it is possible to reduce color drift with main dot position correction for only a correction amount due to temperature change by adjusting correction for magnification errors (main dot positions) in initial states of respective colors due to accuracy of form, assembly errors, and the like of an optical element at the time of shipment.

Figure 5:
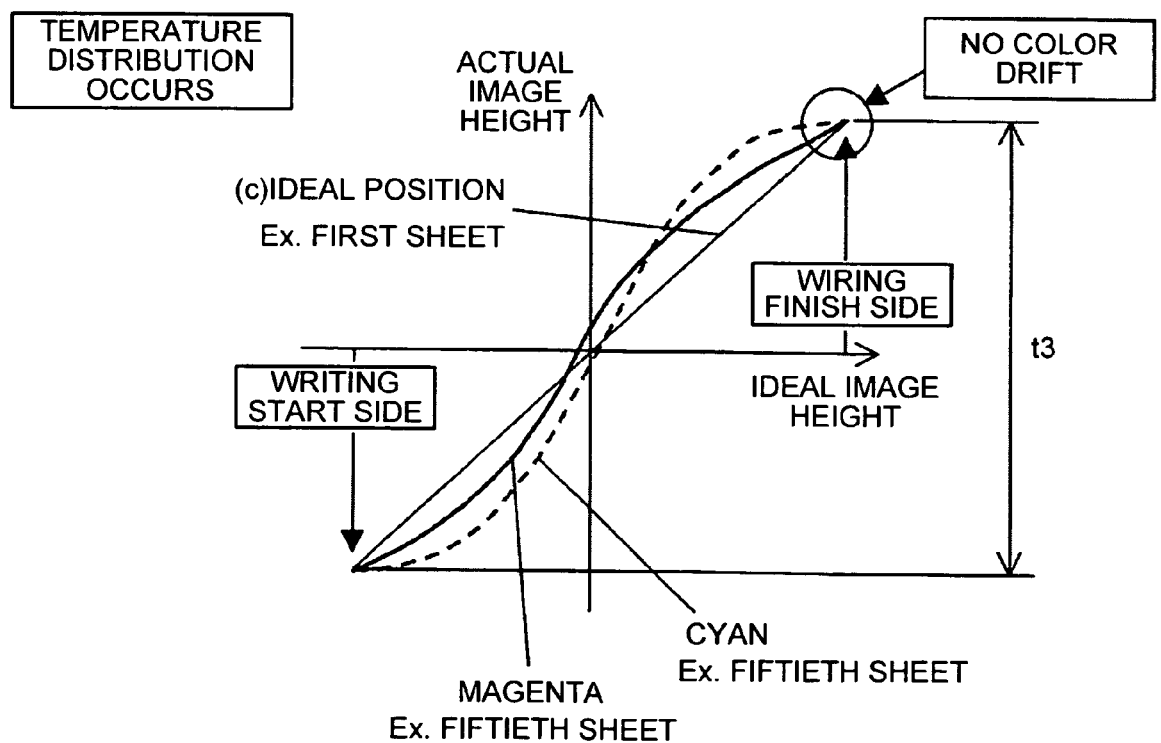
FIG. 5 is a diagram of a case in which a main dot position interval between a writing start end and a writing finish end is corrected when a temperature distribution occurs.

Next, a second embodiment of the present invention will be explained with reference to FIGS. 3 to 5. FIG. 5 is a diagram of a case in which a main dot position interval between a writing start end and a writing finish end is corrected when a temperature distribution occurs.

At the time of continuous printing, since a polygon mirror rotates continuously, the polygon mirror generates heat. In addition, the polygon mirror includes a motor, and heat generation by the drive source is large at the time of continuous operation. Thus, the polygon mirror is a major element as a heat generation source in an optical box. At this point, scanning lenses L1 closest to the polygon mirror have temperature distributions both in a main scanning direction and a sub-scanning direction because, for example, generated heat of the polygon mirror is conducted through the optical box. Since the scanning lenses L1 have a strong refractive index in the main scanning direction, a fluctuation in magnification errors (fluctuation in main dot positions) due to an influence of the temperature distributions is different from the fluctuation at the time of uniform temperature change of the scanning lens in the first embodiment for each image height.

In addition, in recent years, aiming at improvement of a scanning characteristic and improvement of an optical performance, a special surface represented by aspheric surface has been generally adopted in an optical element of an optical scanning unit. An "optical element made of resin", from which this special surface can be formed easily and inexpensively, has been often used. In particular, in an image forming apparatus of a tandem type, since a large number of optical elements are used, the use of the "optical element made of resin" results in significant effect of reduction in cost.

However, when the "optical element made of resin" is used in an optical scanning unit, since the "optical element made of resin" has a large thermal expansion coefficient compared with glass, a shape of the optical element is deformed largely due to a change in temperature, and an optical characteristic of the optical element made of resin changes. In particular, in the opposed scanning system shown in FIG. 3, temperature distributions in scanning lenses L1, which are arranged symmetrically across the polygon mirror, are different affected by an air current or the like due to rotation of the polygon mirror. Thus, the scanning lenses L1 corresponding to plural colors scanned on an identical reflection surface of the polygon mirror also have different temperature distributions in the sub-scanning direction. As a result, fluctuations in magnification errors (fluctuations in main dot positions) in respective colors differ.

For example, in the one side scanning system shown in FIG. 4, since positions of the scanning lenses L1 are the same, a temperature distribution difference in the scanning lenses L1, which are arranged symmetrically across the polygon mirror, as in the oppose scanning system shown in FIG. 3 does not occur. However, since light beams corresponding to respective colors are transmitted side by side in the sub-scanning direction, a height of the lenses in the sub-scanning direction is high, and temperature distributions in the sub-scanning direction cannot be neglected. As a result, fluctuations in magnification errors (fluctuations in main dot positions) in respective colors differ.

Consequently, even if positions of main dots are corrected as in the first embodiment, as shown in FIG. 5, correction of main dot positions in an intermediate image height cannot be performed at high accuracy, although it is possible to correct positions of main dots at writing start end and a writing finish end. Moreover, since the scanning lenses have a different temperature distribution for each color, color drift occurs in an output image, in particular, at the intermediate image height.

As shown in FIG. 5, even if main dot positions are corrected to an ideal state in a first sheet at the time of continuous printing as in the first embodiment, for example, the main dot positions deviate and color drift occurs in a fiftieth sheet. At this point, in the adjustment in the first embodiment, since a correction amount of the main dot positions is different from a correction amount at the time when a temperature distribution occurs, the main dot positions cannot be corrected at the intermediate image height, although it is possible to make the main dot positions at the writing start end and the writing finish end identical.

Thus, in the second embodiment, a temperature sensor is provided in at least the scanning lens L1 closest to the polygon mirror of the scanning optical system to monitor temperature change in the scanning lens L1 with the provided temperature sensor. In the first embodiment, when main dot positional misalignment is corrected by measurement of scanning time during which light beams traverse the photodetectors provided in at least two locations on the writing-start side and the writing-end side outside the effective writing area, it is impossible to judge whether the scanning time changes in a state in which temperature of the scanning lenses is uniform (without a temperature distribution) as at the time of power supply or at the time of standby or changes in a state in which the scanning lenses have a temperature distribution. The provision of the temperature sensor makes it possible to detect time of temperature change and to correct main scanning dot positional misalignment satisfactorily up to the intermediate image height at high accuracy at the time of temperature change to realize a high image quality in a color image.

More specifically, temperature of the scanning lens L1 before rotation of the polygon mirror such as at the time of power supply or at the time of standby is measured by the temperature sensor and, thereafter, temperature change in the scanning lens L1 at the time when the polygon mirror starts to operate according to print start is measured. As a result, when temperature change is detected by the temperature sensor of the scanning lens L1, it is judged that a temperature distribution occurs in the scanning lens L1, and it is judged that temperature change is uniform (a temperature distribution does not occur) before the rotation of the polygon mirror.

As a result, occurrence of a temperature distribution following temperature change of the scanning lens L1 is estimated by measurement or simulation in advance, and data of main dot position correction amounts at the time of the estimation is held as a lookup table, or main dot positional misalignment amounts at respective image heights obtained by measurement or simulation are represented by a function, and correction amounts are obtained by an arithmetic operation. This makes it possible to correct the main dot positional misalignment at the intermediate image height accurately even when a temperature distribution occurs in the scanning leas L1 at the time of continuous printing or the like and to reduce color drift in an output image significantly. Consequently, it is possible to prevent color tint from changing in a first sheet and, for example, a one-hundredth sheet in the continuous printing.

As a matter of course, since temperature change in the scanning lens L1 is temperature change due to heat generation of the polygon mirror, a main dot position correction amount at the time when a temperature distribution occurs is referred to. A referent at this point is a referent different from that in the case in which temperature change is uniform in the scanning lenses L1 described in the first embodiment. Occurrence of a temperature distribution in the scanning lens L1 is different in amount for each color but tendency thereof is the same. Thus, even if identical data is used for plural colors scanned on an identical reflection surface of the polygon mirror as data of a recording unit in the referent or a functional expression of the referent as in the first embodiment, color drift in an image is reduced. Moreover, since the recording unit has correction data or a correction expression independently for each color, it is possible to set phase-shift amounts of main dot positions for each color based on a result of scanning time measurement. The main dot positions are corrected to a target value common to the respective colors, whereby it is possible to reduce color drift of an output image more accurately.

Next, a third embodiment of the present invention will be explained. In the third embodiment, as another system of the second embodiment, rotation time from actuation of a polygon mirror is counted to estimate a temperature distribution occurrence amount of the scanning lens L1. As in the second embodiment, a temperature distribution in the scanning lens L1, which occurs according to the rotation time from the actuation of the polygon mirror, is estimated by measurement or simulation in advance, and data of main dot position correction amounts at the time of the estimation is held as a lookup table, or main dot positional misalignment amounts at respective image heights obtained by measurement or simulation are represented by a function, and correction amounts therefore are obtained by an arithmetic operation. This makes it possible to correct the main dot positional misalignment at the intermediate image height accurately even when a temperature distribution occurs in the scanning leases L1 at the time of continuous printing or the like and to reduce color drift in an output image significantly. Consequently, it is possible to prevent color tint from changing in a first sheet and, for example, a one-hundredth sheet in the continuous printing.

In addition, temperature sensors are provided in the scanning lenses L1 to further count actuation time of the polygon mirror. This makes it possible to judge whether there is a temperature distribution based on values of the temperature sensors when the polygon mirror is actuated again for continuous printing after being stopped once. Thus, it is possible to perform main dot positional misalignment correction more accurately and to reduce color drift. Moreover, since the recording unit has correction data or a correction expression independently for each color, it is possible to set phase-shift amounts of main dot positions for each color based on a result of scanning time measurement. Since the main dot positions are corrected to a target value common to the respective colors, it is possible to reduce color drift of an output image more accurately.

Next, a fourth embodiment of the present invention will be explained. When positional misalignment of main scanning dots is corrected with respect to all image data, a memory capacity increases enormously, and burdens on a control system like cost and a circuit size increase. In addition, time consumed for correction processing is not negligible. Thus, in a fourth embodiment of the present invention, an effective writing area is divided into plural image data areas, and a correction value is set by a unit of the respective data areas. This makes it possible to correct main scanning dot positional misalignment satisfactorily up to an intermediate image height accurately at the time of temperature change and to realize a high image quality in a color image (an image with less color drift) at low cost.

Figure 6:
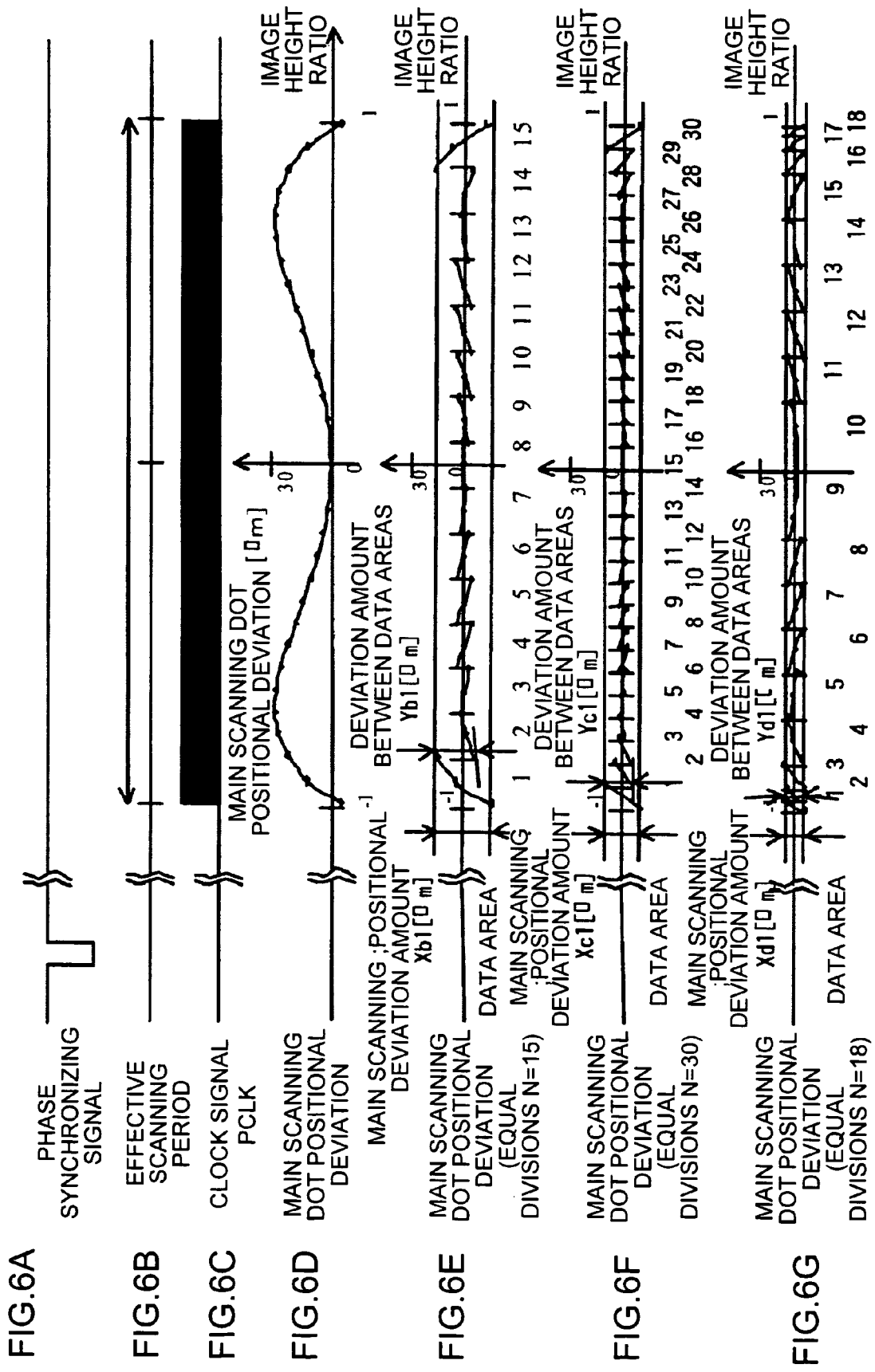
FIGS. 6A to 6G are diagrams of main scanning positional misalignment amounts.

The fourth embodiment will be explained with reference to FIGS. 6A to 6G. FIGS. 6A to 6G are diagrams of main scanning positional misalignment amounts. FIG. 6A is a diagram of a phase synchronizing signal, FIG. 6B is a diagram of an effective scanning period, FIG. 6C is a diagram of a clock signal PCLK, FIG. 6D is a diagram of main scanning dot positional misalignment, FIG. 6E is a diagram of main scanning dot positional misalignment (equal divisions N=15), FIG. 6F is a diagram of scanning dot positional misalignment (equal divisions N=30), and FIG. 6G is a diagram of main scanning dot positional misalignment (equal divisions N=18).

In the main scanning dot positional misalignment amounts shown in FIGS. 6D to 6G, a vertical axis indicates a main scanning positional misalignment amount, and a horizontal axis indicates an image height. For example, when main scanning dot positional misalignment on a lookup table is represented by FIG. 6D based on scanning time between two points measured during a print operation, as shown in FIGS. 6E to 6G, all image data are divided into plural areas, and a representative value (an average, etc.) of main scanning dot positional misalignment amounts in the respective data areas is adopted as a correction value. This makes it possible to correct dot positional misalignment satisfactorily without increasing a memory capacity. For example, when a phase of a pixel clock is shifted by a unit of ±⅛ dot shift, it is possible to adjust a correction amount of linearity from 0% to 12.5%. In the case of writing at 1200 dpi, main scanning positional misalignment within an effective writing width can be reduced to 2.6 μm (21.2 μm/8). Note that, in FIGS. 6A to 6G, more satisfactory correction is possible as the number of division is larger. However, due to limitations of a memory capacity and correction processing time, it is desirable to determine an optimum number of divisions.

Figure 7:
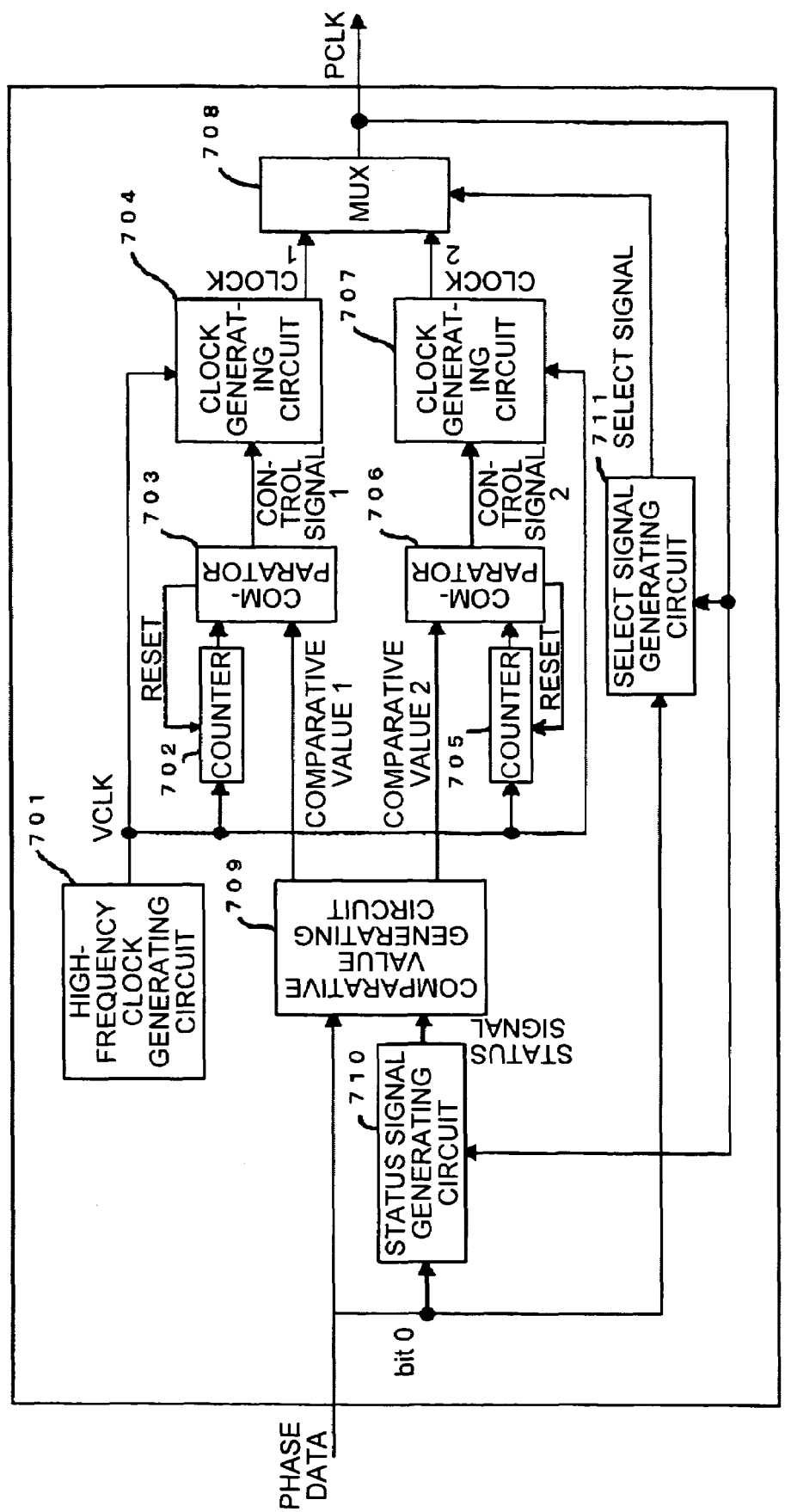
FIG. 7 is a block diagram of a structure of a pixel clock generating circuit.
Figure 8:
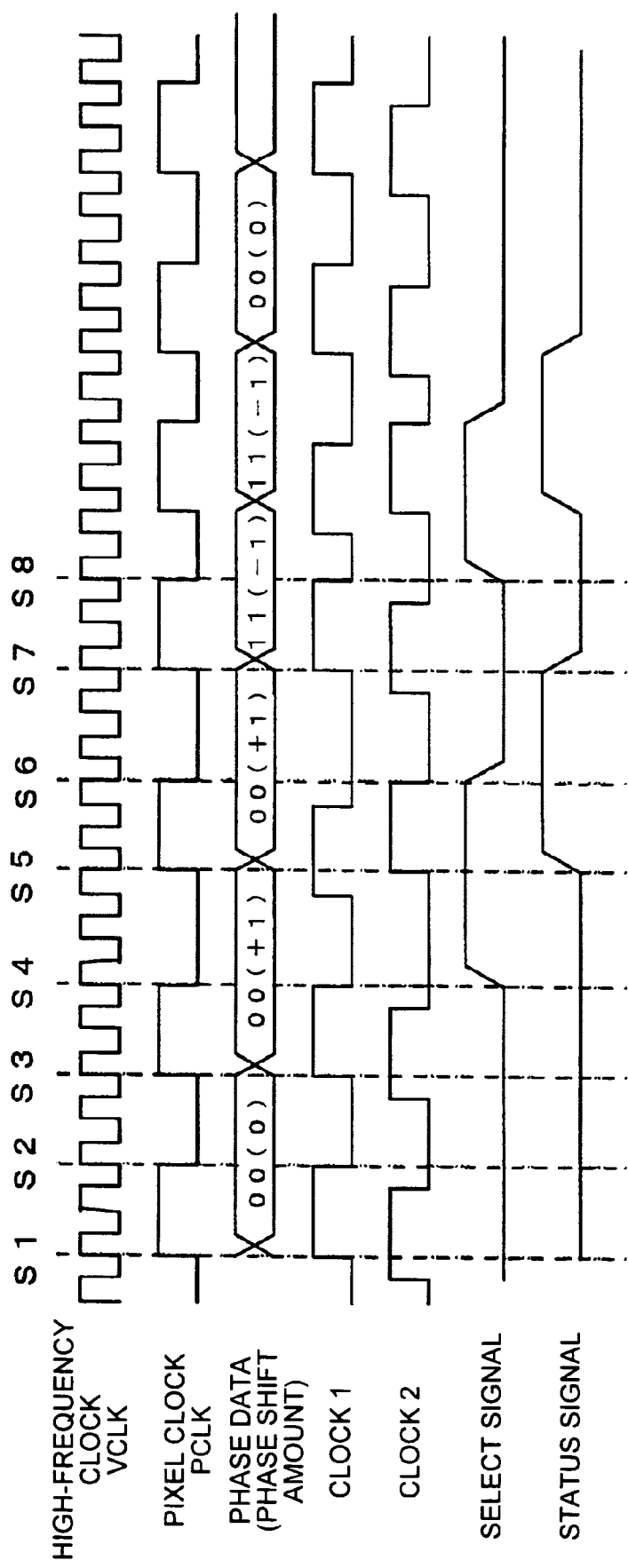
FIG. 8 is a diagram of a phase-shift amount of a pixel clock and a state of switching a clock 1 and a clock 2.
Figures 9, 10:
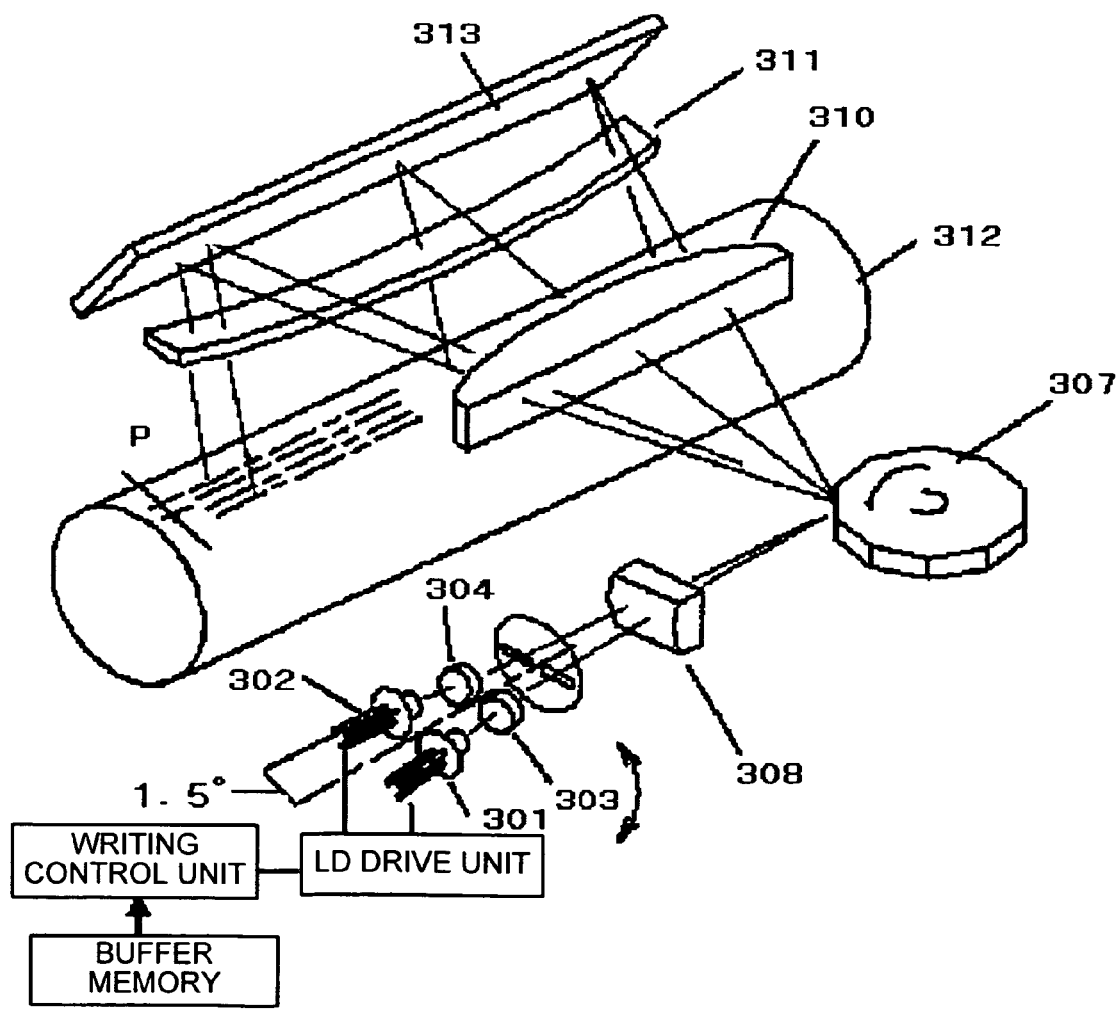
FIG. 9 is a diagram of a correspondence relation between a phase-shift amount and phase data given from the outside.
FIG. 10 is a perspective view of an example of a structure of a multi-beam scanning device.

Next, a fifth embodiment of the present invention will be explained with reference to FIGS. 7 to 9. FIG. 7 is a block diagram showing a structure of a pixel cock generating circuit. FIG. 8 is a diagram of a phase-shift amount of a pixel clock and a state of switching a clock 1 and a clock 2. FIG. 9 is a diagram of a correspondence relation between a phase-shift amount and phase data given from the outside.

In the fifth embodiment, the correction of dot positions in the first embodiment is performed by phase shift of a pixel clock based on a high-frequency clock higher than the pixel clock.

Note that, in this embodiment, a case in which a pixel clock PCLK equivalent to four divided cycles of the high-frequency clock VCLK is generated and phase shift is set to +⅛ PCLK and −⅛ PCLK will be explained. Note that FIG. 9 indicates a correspondence relation between a phase-shift amount and phase data given from the outside. FIG. 8 indicates a phase-shift amount of a pixel clock and switching of a clock 1 and a clock 2.

First, a structure of the pixel clock generating circuit in FIG. 7 will be explained.

A high-frequency pixel clock generating circuit (701) generates a high-frequency clock (VCLK) to be a reference for the pixel clock PCLK. A counter (702) is a counter that operates at a rising edge of a clock of VCLK. A comparator (703) compares a value of the counter (702) and a comparative value set in advance and a comparative value 1 outputted by a comparative value generating circuit (709) and outputs a control signal 1 based on a result of the comparison. A clock generating circuit (704) generates a clock 1 based on the control signal 1. A counter (705) is a counter that operates at a falling edge of the clock of VCLK. A comparator (706) compares a value of the counter (705) and a comparative value set in advance and a comparative value 2 outputted by the comparative value generating circuit (709) and outputs a control signal 2 based on a result of the comparison. A clock generating circuit (707) generates a clock 2 based on the control signal 2. A multiplexer (MUX) (708) outputs the clock 1 or the clock 2 as alternatives PCLK based on a select signal generated by a select signal generating circuit (711) to be described later. The comparative value generating circuit (709) outputs the comparative value 1 and the comparative value 2 based on phase data inputted from the outside and a status signal outputted by a status signal generating circuit (710). The status signal generating circuit (710) toggles a signal at timing of a rising edge of PCLK and outputs the signal as a status signal when bit0 of the phase data is "1". The select signal generating circuit (711) toggles a signal at timing of a falling edge of PCLK and outputs the signal as a select signal when bit0 of the phase data is "1".

Next, an operation in the pixel clock generating circuit in FIG. 7 will be explained with reference to FIGS. 8 and 9. Note that numbers shown in FIG. 8 correspond to S1 to S8 indicated below. In addition, in this embodiment, it is assumed that the operation starts in a state in which the clock 1 is selected by the multiplexer (MUX) (708).

First, the pixel clock generating circuit gives phase data 00 in synchronization with the pixel clock PCLK (S1). Since the phase data bit0 is 0, the pixel clock generating circuit outputs the clock 1 as the pixel clock PCLK while keeping the select signal at 0 and keeping the clock 1 as selected (S2). Consequently, the pixel clock PCLK is a clock of a phase-shift amount 0.

Next, the pixel clock generating circuit gives 01 as the phase data (S3). In this case, since the phase data bit0 is at "1", the pixel clock generating circuit toggles the select signal to "1" at a rising edge of the pixel clock PCLK and selects a clock 2 to output the clock 2 as the pixel clock PCLK (S4). The clock 2 at this point is a clock with a cycle extended by 1VCLK as shown in FIG. 8. Consequently, the pixel clock PCLK phase-shifted by +⅛ PCLK is obtained.

Next, when the pixel clock generating circuit gives 01 as the phase data again (S5), since the phase data bit0 is "1", the pixel clock generating circuit toggles a select signal at a falling edge of the pixel clock PCLK to "0" and selects the clock 1 to output the clock 1 as the pixel clock PCLK (S6). The clock 1 at this point is a clock with a cycle extended by 1 VCLK as shown in FIG. 8. Consequently, the pixel clock PCLK phase-shifted by +⅛ PCLK is obtained.

Next, the pixel clock generating circuit gives 11 as the phase data (S7). Since the phase data bit0 is "1", the pixel clock generating circuit toggles the select signal to "1" at a rising edge of the pixel clock PCLK and selects the clock 2 to output the clock 2 as the pixel clock PCLK (S8). At this point, the clock 1 is a clock with a cycle shortened by 1 VCLK as shown in FIG. 8. Consequently, the pixel clock PCLK phase-shifted by −⅛ PCLK is obtained.

As described above, the cycles of the clock 1 and the clock 2 are changed according to phase data, and the clock 1 and the clock 2 are switched to be outputted as the pixel clock PCLK. This makes it possible to obtain the pixel clock PCLK phase-shifted by a step of ⅛ PCLK.

Data is set in a phase data storing circuit from the outside, and the phase data storing circuit outputs phase data sequentially in synchronization with the pixel clock PCLK. Consequently, for example, when phase data for correcting scanning unevenness caused by a characteristic of scanning lenses is required, if phase data is stored in the phase data storing circuit in advance, and the phase data is outputted sequentially from first phase data in the phase data storing circuit every time a line is scanned, it is unnecessary to input the same data from the outside for every line. Note that the phase data inputted in FIG. 7 is generated through the phase synchronizing circuit from dot positional misalignment correction amounts set in the lookup table based on scanning time during which a light beam passes the two photodetectors.

Next, a sixth embodiment of the present invention will be explained with reference to FIGS. 10 and 11. In the sixth embodiment, a light source of an optical scanning unit is a multi-beam light source formed by optically synthesizing plural semiconductor lasers or constituted by a monolithic semiconductor laser array.

FIG. 10 is a diagram of a multi-beam scanning device in this embodiment. Note that, in the first embodiment, as shown in FIG. 10, two semiconductor lasers (301, 302) are used and arranged in a sub-scanning direction with optical axes C of collimate lenses (303, 304) made symmetry.

The semiconductor lasers (301, 302) are laid out such that optical axes of the semiconductor lenses (301, 302) and optical axes of the collimate lenses (303, 304) are identical to give emission angles symmetrically in a main scanning direction and emission axes cross with each other at a reflection point of a polygon mirror (307). Plural beams emitted from the respective semiconductor lasers (301, 302) are used for scanning collectively in the polygon mirror (307) via a cylinder lens (308) and focused on a photosensitive element by an fθ lens (310) and a toroidal lens (311). Printing data for one line is stored in a buffer memory for each light emission source and read out for each surface of the polygon mirror, whereby recording is performed for two lines simultaneously. FIG. 11 is a disassembled perspective view of a structure of a light source unit in FIG. 10.

Figure 11:
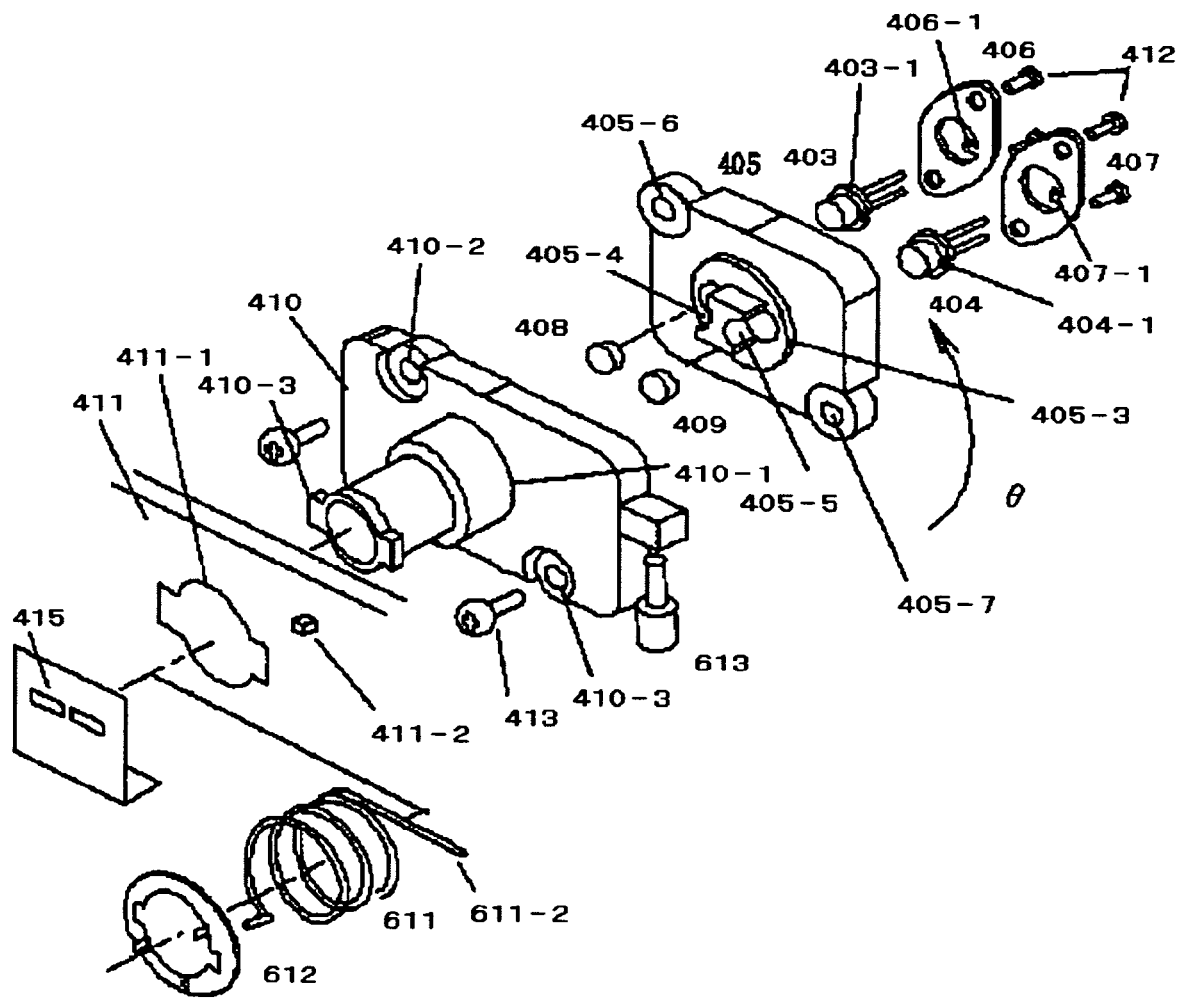
FIG. 11 is a perspective view of an example of a structure of a first light source unit in the multi-beam scanning device.

In FIG. 11, semiconductor lasers (403, 404) are fixed by screws (412) from the rear side thereof, respectively, with cylindrical heat sink sections (403-1, 404-1) individually fitted into fitting holes (405-1, 405-2) (not shown), which are formed on the back of a base member (405) inclined slightly at a predetermined angle, about 1.5° in this embodiment, in a main scanning direction, and projections (406-1, 407-1) of pressing members (406, 407) aligned with cutout sections of the heat sink section to align arranging directions of the light emitting sources. In addition, collimate lenses (408, 409) are positioned and adhered such that divergent beams emitted from light emitting points become parallel light beams by adjusting an optical axis direction with outer peripheries thereof placed along semicircular attachment guide surfaces (405-4, 405-5) of the base member (405), respectively. Note that, in this embodiment, since rays from the respective semiconductor lasers are set to cross in a main scanning surface, the fitting holes (405-1, 405-2) and the semicircular attachment guide surfaces (405-4, 405-5) are formed to be inclined along the rays. The base member (405) is fixed by engaging a cylindrical engaging section (405-3) with a holder member (410) and screwing screws (413) into screw holes (405-6, 405-7) via through holes (410-2) to constitute a light source unit.

In the light source unit having such a structure, a cylindrical section (410-1) of the holder member is fitted into a reference hole (411-1) provided in an attachment wall (411) of an optical housing, and a spring (611) is inserted into the reference hole (411-1) from the front side to engage a stopper member (612) with a cylindrical section projection (410-3), whereby the holder member (410) is held in close attachment to the back of the attachment wall (411). At this point, a torque is generated with the center of the cylindrical section as a rotation axis by putting an end of the spring on a projection (411-2) to rotate the entire unit around a periphery θ of an optical axis and adjust a pitch with an adjustment screw (613) that is provided to stop the torque. An aperture (415) is provided with slits for the respective semiconductor lasers and attached to the optical housing to define an emission diameter of light beams.

Figure 12:
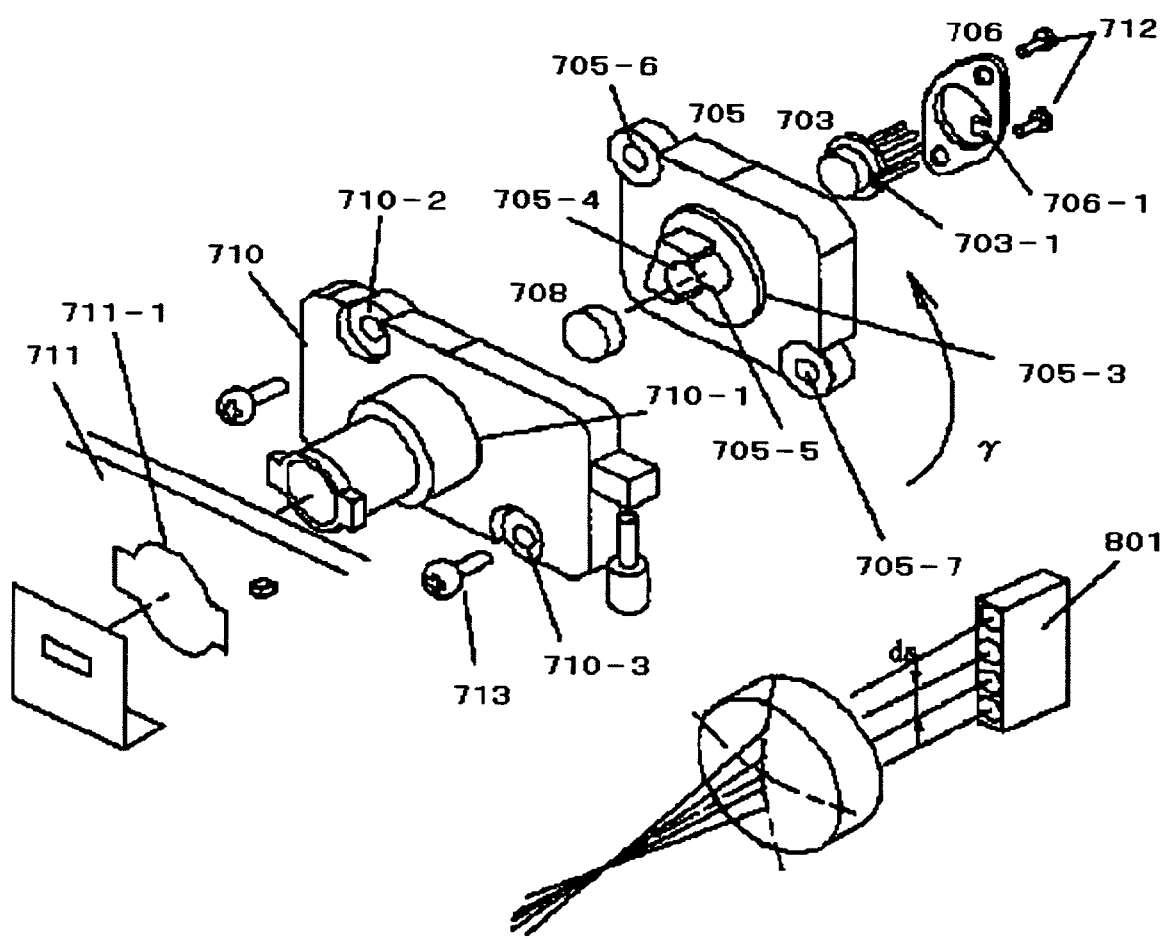
FIG. 12 is a perspective view of an example of a structure of a second light source unit in the multi-beam scanning device.

Note that FIG. 12 is a diagram of the second embodiment and an example in which light beams from a semiconductor laser array having four light emission sources are synthesized using beam synthesizing means. Since basic elements are the same as those in the example of a structure shown in FIG. 11, an explanation of the elements will be omitted here.

Since respective beams of a multi-beam form electrostatic latent images on a photosensitive element through substantially an identical optical path in an optical scanning optical system, respectively, dot positional misalignment of the respective beams can be considered to be substantially the same degree. Thus, in this embodiment, a circuit structure can be simplified by measuring scanning time using only one beam of a multi-beam light source.

Figure 13:
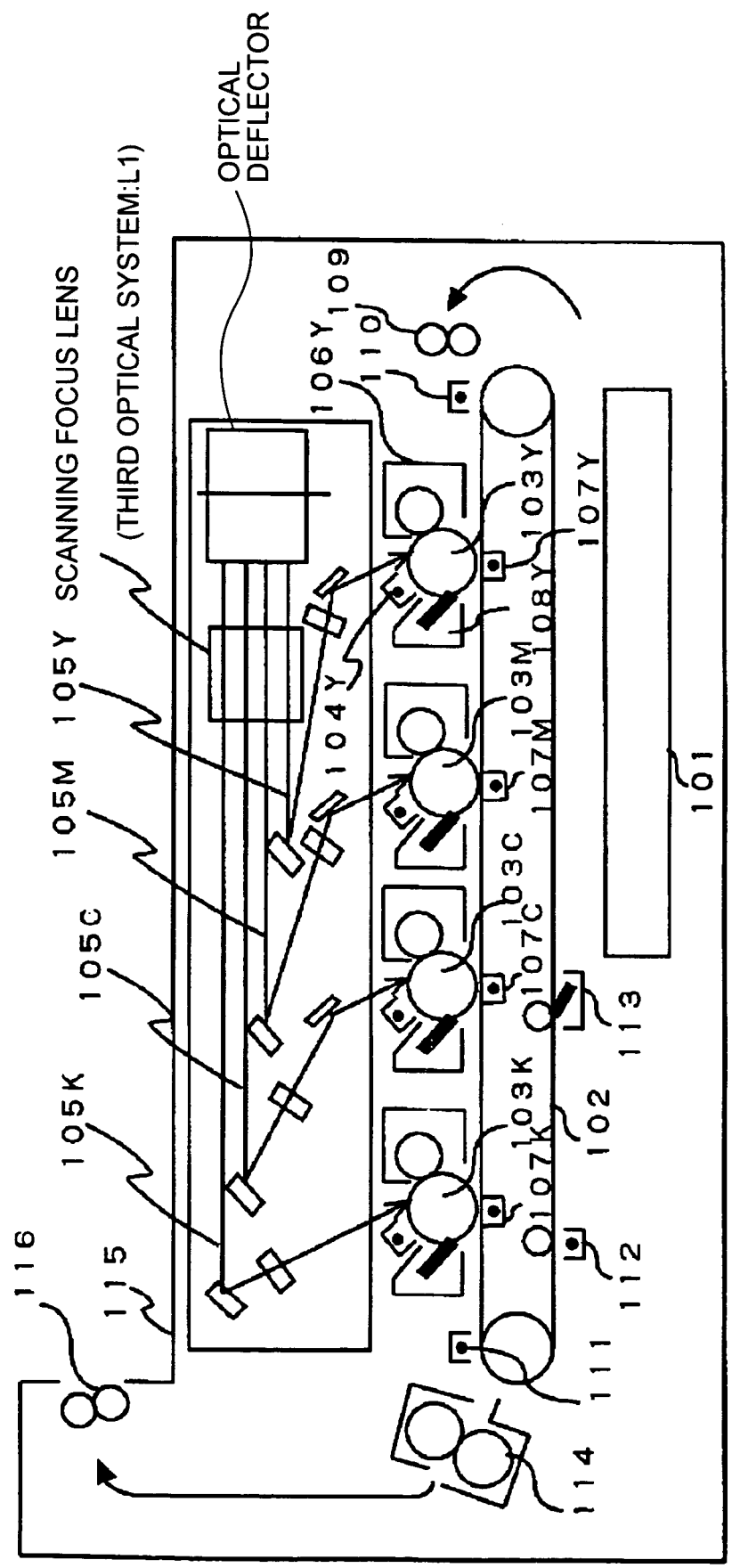
FIG. 13 is a diagram of an example of a structure of an image forming apparatus including the optical scanning unit according to the present invention.

It is possible to apply the optical scanning units of the embodiments to a full-color laser printer apparatus of a tandem type. An example of application to the full-color laser printer apparatus of the tandem type will be hereinafter explained with reference to FIG. 13.

A conveyor belt (102), which is disposed in a horizontal direction and conveys transfer paper fed from a sheet feeding cassette (101), is provided on a lower side in the apparatus. A photosensitive element for yellow Y (103Y), a photosensitive element for magenta M (103M), a photosensitive element for cyan C (103C), and a photosensitive element for black K (103K) are disposed at equal intervals in order from an upstream side. Note that, in the following explanation, components are distinguished by attaching suffixes Y, M, C, and K to reference numerals as required. These photosensitive elements (103Y, 103M, 103C, and 103K) are formed with an identical diameter, and process members are disposed around the photosensitive elements in order according to an electrophotographic process. As an example, in the photosensitive element (103Y), an electrifying charger (104Y), an optical scanning optical system (105Y), a developing device (106Y), a transfer charger (107Y), a cleaning device (108Y), and the like are disposed in order. The same holds true for the other photosensitive elements (103M, 103C, and 103K). In this embodiment, the photosensitive elements (103Y, 103M, 103C, and 103K) are used as irradiated surfaces set for each color, and the optical scanning optical systems (105Y, 105M, 105C, and 105K) are provided in a one-to-one correspondence relation. However, M and Y share a scanning lens L1 and K and C share another scanning lens L1. In addition, around the conveyor belt (102), a registration roller (109) and a belt electrifying charger (110) are provided to be located further on an upstream side than the photosensitive element (105Y), and a belt separating charger (111), an electricity removing charger (112), a cleaning device (113), and the like are provided in order to be located further on a downstream side than the photosensitive element (105K). In addition, a fixing device (114) is provided further on a downstream side in a conveying direction than the belt separating charger (111) and connected to a sheet discharge tray (115) by a sheet discharging roller (116).

In such a structure of the full-color laser printer apparatus of the tandem type, for example, at the time of a full color mode (plural color mode), electrostatic latent images are formed on the respective photosensitive elements (103Y, 103M, 103C, and 103K) by optical scanning of light beams by the respective optical scanning units (105Y, 105M, 105C, and 105K) based on respective image signals for Y, M, C, and Y. These electrostatic latent images are developed by color toners corresponding thereto to be changed to toner images. The toner images are sequentially transferred to be superimposed one on top of another on a transfer paper, which is electrostatically attracted on the conveyor belt (102) and conveyed, and are fixed as a full-color image and then discharged.

An optical scanning unit including the optical scanning optical systems (105Y, 105M, 105C, and 105K) of this image forming apparatus is adopted as the optical scanning unit in the embodiments. This makes it possible to establish an image forming apparatus that is capable of reproducing a high-quality image without color drift.

Note that the embodiments described above are exemplary embodiments of the present invention, and various alterations are possible within a range not departing from the spirit of the present invention. For example, in the embodiments, main dot positional misalignment is corrected accurately by counting operation time of a polygon mirror. However, the same effect can be obtained when the main dot position correction method of the embodiments is applied by monitoring temperature rise in a heat generating source, for example, a fixing device in an image forming apparatus main body.

Moreover, the plural scanning optical systems corresponding to the respective colors are regarded as plural scanning optical systems for the respective colors even in a case in which part of scanning lenses thereof are shared by the colors. For example, in FIG. 4, a scanning lens closest to an optical deflector is shared by the colors, and scanning lenses on a surface to be scanned side are provided for the respective colors. In this case, the scanning optical systems correspond to photosensitive elements of four colors, and the number of the scanning optical systems is counted as four.

As explained above, in the optical scanning unit, the image forming apparatus, and the method of correcting positional misalignment according to the first to the sixth embodiments, photodetectors, which detect light beams irradiated from plural light sources and caused to perform scanning on a surface to be scanned along a scanning direction by an optical deflector, are provided at least in two locations on a writing-start side and a writing-end side outside a writing area on the surface to be scanned, scanning time, during which light beams traverse the photodetectors provided in two locations, is measured, and respective dot positions of image data in the writing area are corrected to arbitrary positions based on a fluctuation amount in the measured scanning time. This makes it possible to correct deviation of main scanning dot positions satisfactorily even at the time of temperature change and form a high-quality image with less color drift in forming a color image.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical scanning unit comprising:
   an optical deflector that deflects light beams emitted from a plurality of light sources corresponding to each of a plurality of colors;
   a plurality of scanning optical systems that focuses the light beams deflected by the optical deflector on a writing area corresponding to each of the colors on a surface to be scanned; and
   a pixel-clock generating unit that causes the optical deflector to scan the light beams emitted from the light sources on the surface to be scanned along a scanning direction to shift phases of respective signals of a pixel clock that forms an image based on phase-shift data according to timing of a clock signal, wherein
   a photodetector that detects the light beams is arranged in at least two locations on a writing-start side and a writing-end side outside the writing area, and
   the optical scanning unit measures a scanning time, during which light beams pass through each photodetector arranged in one of the at least two locations, and corrects respective dot positions of image data in the writing area to arbitrary positions based on an amount of fluctuation of the scanning time measured.

2. The optical scanning unit according to claim 1, further comprising a recording unit in which a relation between the scanning time and an amount of correcting the dot positions in advance, wherein
   each photodetector arranged in one of the at least two locations is provided only in a scanning optical system corresponding to one color from among the scanning optical systems corresponding to a plurality of colors scanned on an identical reflection surface of the optical deflector, and
   the optical scanning unit sets an amount of a phase-shift in the dot positions corresponding to the colors scanned on the identical reflection surface of the optical deflector based on a result of the measurement of the scanning time using the recording unit.

3. The optical scanning unit according to claim 2, wherein the optical scanning unit measures a rotation time of the optical deflector, and sets the amount of the phase-shift in the dot positions for each of the colors based on a result of the measurement of the rotation time.

4. The optical scanning unit according to claim 2, wherein
   the recording unit is provided independently for each of the colors, and
   the optical scanning unit sets the amount of the phase-shift in the dot positions for each of the colors based on a result of the measurement of the scanning time.

5. The optical scanning unit according to claim 2, wherein the optical scanning unit divides the writing area into a plurality of image data areas, and sets the amount of the phase-shift for each of the image data areas.

6. The optical scanning unit according to claim 1, wherein
   at least a lens closest to the optical deflector among a plurality of lenses included in the scanning optical system is made of plastic, and
   the lens made of plastic includes at least one temperature sensor.

7. The optical scanning unit according to claim 1, wherein the optical scanning unit performs a correction of the dot positions based on a high-frequency clock higher than the pixel clock.

8. The optical scanning unit according to claim 1, wherein the light source is a multi-beam light source formed with a plurality of semiconductor lasers optically combined or a monolithic semiconductor laser array.

9. The optical scanning unit according to claim 8, wherein the optical scanning unit measures the scanning time using a single beam of the multi-beam light source.

10. An image forming apparatus that performs optical writing to an image carrier using an optical scanning unit, and forms an electrostatic latent image on the image carrier using an electrophotographic method, wherein
    the optical scanning unit includes
       an optical deflector that deflects light beams emitted from a plurality of light sources corresponding to each of a plurality of colors;

a plurality of scanning optical systems that focuses the light beams deflected by the optical deflector on a writing area corresponding to each of the colors on a surface to be scanned; and a pixel-clock generating unit that causes the optical deflector to scan the light beams emitted from the light sources on the surface to be scanned along a scanning direction to shift phases of respective signals of a pixel clock that forms an image based on phase-shift data according to timing of a clock signal, a photodetector that detects the light beams is arranged in at least two locations on a writing-start side and a writing-end side outside the writing area, and the optical scanning unit measures a scanning time, during which light beams pass through the photodetector arranged in the two locations, and corrects respective dot positions of image data in the writing area to arbitrary positions based on an amount of fluctuation of the scanning time measured.

11. A method of correcting a positional misalignment in an optical scanning unit that includes an optical deflector that deflects light beams emitted from a plurality of light sources corresponding to each of a plurality of colors, a plurality of scanning optical systems that focuses the light beams deflected by the optical deflector on a writing area corresponding to each of the colors on a surface to be scanned, and a pixel-clock generating unit that causes the optical deflector to scan the light beams emitted from the light sources on the surface to be scanned along a scanning direction to shift phases of respective signals of a pixel clock that forms an image based on phase-shift data according to timing of a clock signal, the method comprising:

detecting the light beams in at least two locations on a writing-start side and a writing-end side outside the writing area;

measuring a scanning time, during which light beams pass through a photodetector arranged in each of the two locations; and correcting respective dot positions of image data in the writing area to arbitrary positions based on an amount of fluctuation of the scanning time measured.

12. The method according to claim 11, wherein the optical scanning unit further includes a recording unit, in which a relation between the scanning time and an amount of correcting the dot positions is stored in advance, each photodetector is provided only in a scanning optical system corresponding to one color from among the scanning optical systems corresponding to a plurality of colors scanned on an identical reflection surface of the optical deflector, and the method further comprising setting an amount of a phase-shift in the dot positions corresponding to the colors scanned on the identical reflection surface of the optical deflector based on a result of the measurement of the scanning time using the recording unit.

13. The method according to claim 11, further comprising:

measuring a rotation time of the optical deflector; and setting the amount of the phase-shift in the dot positions for each of the colors based on a result of the measurement of the rotation time to correct the respective dot positions of the image data to arbitrary positions.

14. The method according to claim 12, wherein the recording unit is provided independently for each of the colors, and the setting includes setting the amount of the phase-shift in the dot positions for each of the colors based on a result of the measurement of the scanning time.

15. The method according to claim 12, further comprising dividing the writing area into a plurality of image data areas, wherein the setting includes setting the amount of the phase-shift for each of the image data areas to correct the respective dot positions of the image data to arbitrary positions.

16. The method according to claim 11, wherein at least a lens closest to the optical deflector among a plurality of lenses included in the scanning optical system is made of plastic, the lens made of plastic includes at least one temperature sensor, and the correcting includes correcting the respective dot positions of the image data to arbitrary positions when the temperature sensor senses a change in an ambient temperature.

17. The method according to claim 11, wherein the correcting includes correcting the respective dot positions based on a high-frequency clock higher than the pixel clock.

18. The method according to claim 11, wherein the light source is a multi-beam light source formed with a plurality of semiconductor lasers optically combined or a monolithic semiconductor laser array, and the measuring includes measuring the scanning time using the multi-beam light source to correct the respective dot positions of the image data to arbitrary positions.

19. The method according to claim 18, wherein the measuring includes measuring the scanning time using a single beam of the multi-beam light source.

* * * * *